US012083583B2

(12) United States Patent
Lai

(10) Patent No.: US 12,083,583 B2
(45) Date of Patent: Sep. 10, 2024

(54) METHOD FOR FORMING HITCH BALL HEAD

(71) Applicant: CHUEN CHAO ENTERPRISES CO., LTD., Kaohsiung (TW)

(72) Inventor: Chuan-Jung Lai, Pingtung (TW)

(73) Assignee: CHUEN CHAO ENTERPRISES CO., LTD., Kaohsiung (TW)

( * ) Notice: Subject to any disclaimer, the term of this patent is extended or adjusted under 35 U.S.C. 154(b) by 0 days.

(21) Appl. No.: 18/175,586

(22) Filed: Feb. 28, 2023

(65) Prior Publication Data

US 2024/0165694 A1 May 23, 2024

(30) Foreign Application Priority Data

Nov. 23, 2022 (TW) .................................. 111144765

(51) Int. Cl.
*B21K 7/12* (2006.01)
*B60D 1/06* (2006.01)
*F16C 11/06* (2006.01)

(52) U.S. Cl.
CPC .................. *B21K 7/12* (2013.01); *B60D 1/06* (2013.01); *F16C 11/0685* (2013.01)

(58) Field of Classification Search
CPC ............ B21J 5/008; B21K 7/12; B21K 23/04; B60D 1/06; F16C 11/0685; F16C 11/069; F16C 11/0604
See application file for complete search history.

(56) References Cited

U.S. PATENT DOCUMENTS

2014/0375020 A1* 12/2014 Bowe ........................ B60D 1/52
280/511

FOREIGN PATENT DOCUMENTS

KR   20080114219 A * 12/2008 ............. B21K 1/762
WO   WO-2005021184 A1 * 3/2005 ............... B21K 1/44

OTHER PUBLICATIONS

Machine Translation of KR 10 2008 0114219A (Year: 2008).*
Machine Translation of WO 2005021184A1 (Year: 2005).*

* cited by examiner

*Primary Examiner* — Christopher J. Besler
(74) *Attorney, Agent, or Firm* — MUNCY, GEISSLER, OLDS & LOWE, P.C.

(57) ABSTRACT

A method for forming a hitch ball head includes a pre-forging step, in which a columnar blank is prepared and is extruded to form a pre-forged blank; a first forging step, in which the pre-forged blank is extruded and drawn to form first and second forged portions; a second forging step, in which the pre-forged blank is extruded and drawn to shorten a length of the first forged portion and to form the second forged portion into a to-be-formed section and a columnar base section; a first forming step, in which the pre-forged blank is extruded to form the first forged portion into a ball head portion and to form the columnar base section into a connecting segment and a columnar segment; and a second forming step, in which the pre-forged blank is extruded to form the to-be-formed section into a seat section to thereby obtain the hitch ball head.

5 Claims, 3 Drawing Sheets

METHOD FOR FORMING HITCH BALL HEAD

CROSS-REFERENCE TO RELATED APPLICATION

This application claims priority to Taiwanese Invention Patent Application No. 111144765, filed on Nov. 23, 2022.

FIELD

The disclosure relates to a forming method, and more particularly to a method for forming a hitch ball head.

BACKGROUND

Referring to FIG. 1, a trailer hitch 1 is a vehicle component disposed at the rear of a vehicle to allow engagement with a trailer, and is the most concentrated part of the force when the vehicle tows the trailer, so the trailer hitch 1 must be made of a high-strength metal to obtain a good tolerance. The trailer hitch 1 has a hitch ball head 11 for connection with the trailer. The hitch ball head 11 is generally made by a hot forging process, that is, after heating and shaping, it is then processed by cutting and polishing. This method for making the hitch ball head 11 will generate material waste which accounts for about 40% of the total material, resulting in material waste and cost increase. Hence, there is still room for improvement of this method for making the hitch ball head 11.

SUMMARY

Therefore, an object of the present disclosure is to provide a method for forming a hitch ball head that can alleviate at least one of the drawbacks of the prior art.

Accordingly, the method for forming a hitch ball head of this disclosure includes:

a pre-forging step, in which a columnar blank is prepared and is extruded to form a pre-forged blank;

a first forging step, in which the pre-forged blank is extruded and drawn to form a first forged portion, and a second forged portion connected to the first forged portion and having an outer diameter smaller than that of the first forged portion, wherein, an end of the first forged portion, which is connected to the second forged portion, has an outer diameter that gradually decreases in a direction away from the first forged portion;

a second forging step, in which the pre-forged blank is extruded and drawn to shorten a length of the first forged portion and to form the second forged portion into a to-be-formed section connected to the first forged portion, and a columnar base section connected to the to-be-formed section and having an outer diameter smaller than that of the to-be-formed section;

a first forming step, in which the pre-forged blank is extruded to form the first forged portion into a ball head portion and to form the columnar base section into a connecting segment connected to the to-be-formed section at an end that is opposite to the ball head portion and having an outer diameter smaller than that of the to-be-formed section, and a columnar segment connected to the connecting segment and having an outer diameter smaller than that of the connecting segment, wherein, a junction between the connecting segment and the columnar segment is formed with a fillet; and a second forming step, in which the pre-forged blank is extruded to form the to-be-formed section into a seat section to thereby obtain the hitch ball head, the seat section including a head-supporting segment connected to the ball head portion and having an outer diameter that gradually increases in a direction away from the ball head portion, and a seat body connected to and disposed between the head-supporting segment and the connecting segment and having an outer diameter greater than that of the head-supporting segment.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
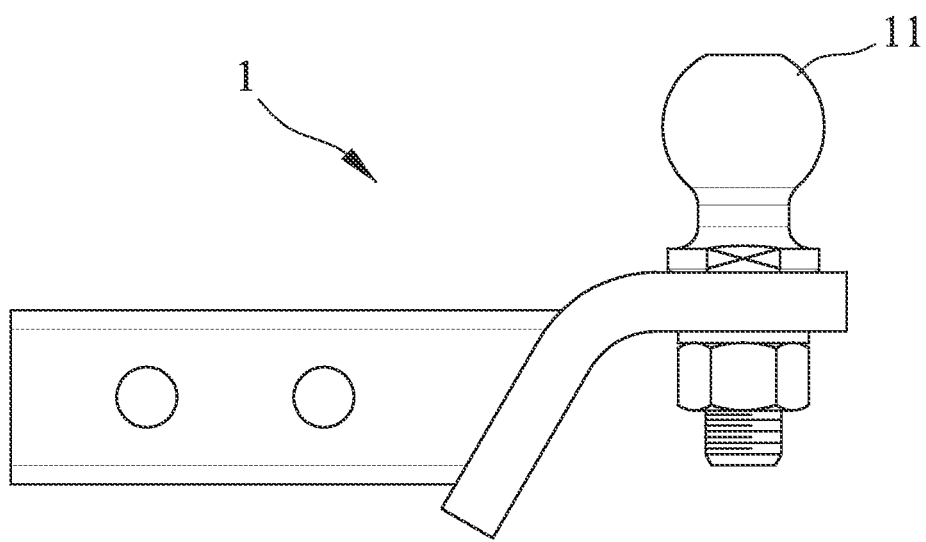
FIG. 1 is a side view of a conventional trailer hitch and a hitch ball head thereof.
Figure 2:
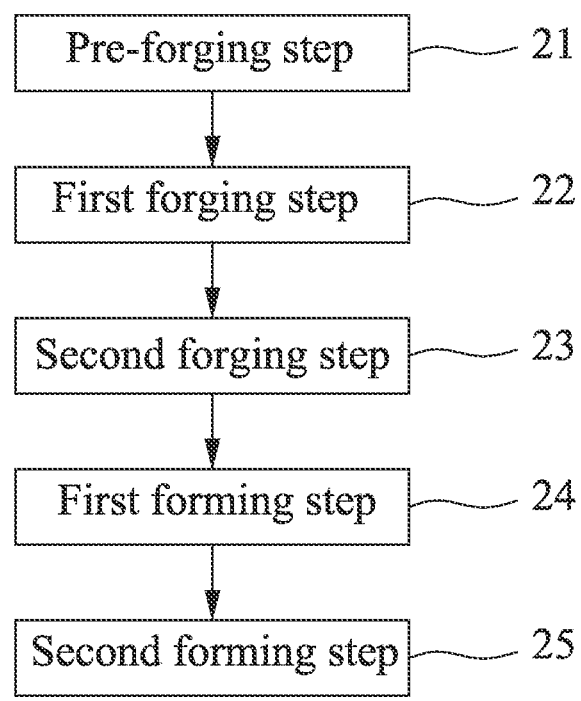
FIG. 2 is a flow chart, illustrating the steps involved in a method for forming a hitch ball head according to an embodiment of the present disclosure.
Figure 3:
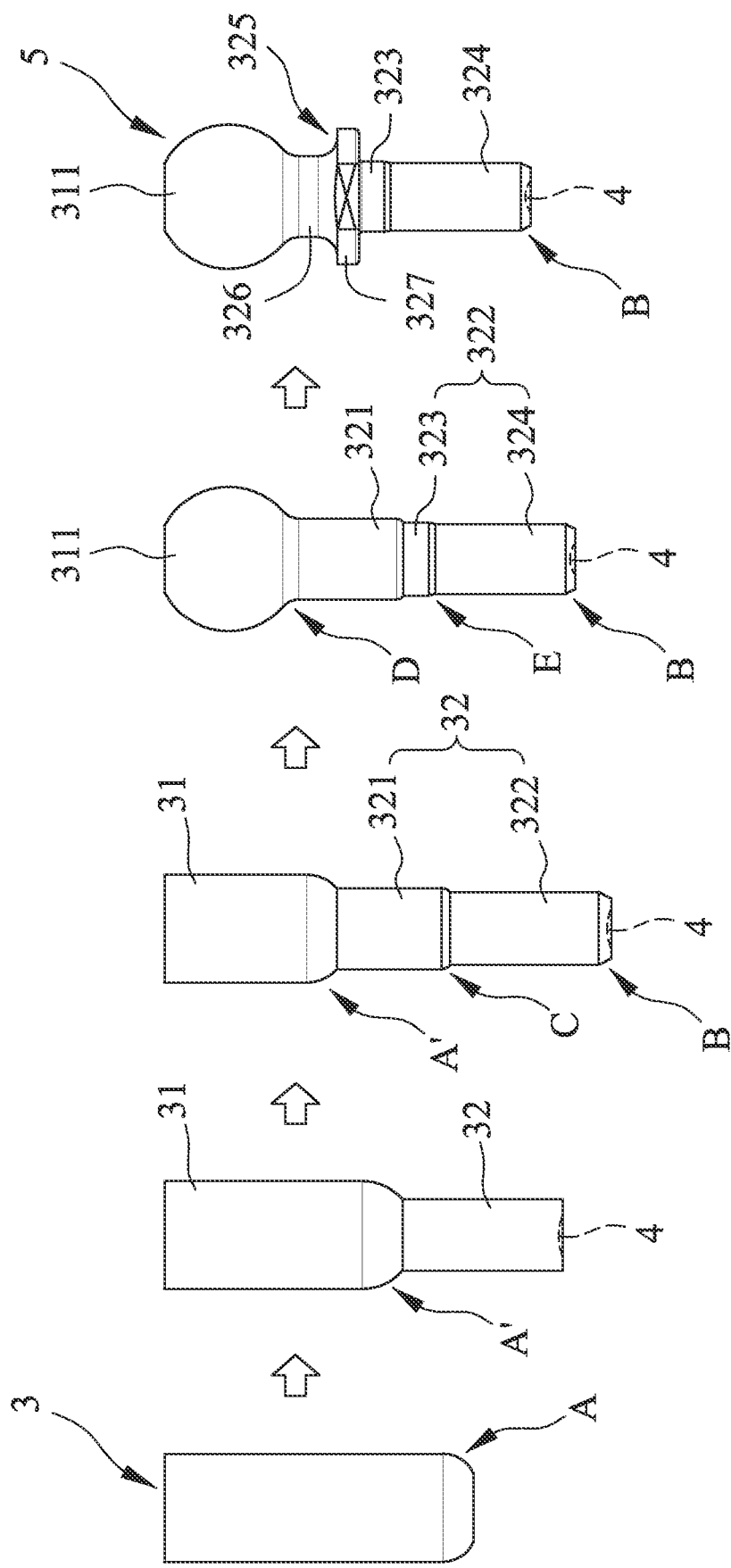
FIG. 3 is a schematic view illustrating a forming condition of each step of the embodiment.

Referring to FIGS. 2 and 3, a method for forming a hitch ball head 5 according to an embodiment of the present disclosure adopts a cold forging process at room temperature. The method of this disclosure comprises steps 21 to 25.

In step 21, a columnar blank having a determined length is obtained by cutting, after which the columnar blank is extruded to form a pre-forged blank 3. A lower end (A) of the pre-forged blank 3 has an outer diameter that gradually decreases along an axial direction.

In step 22, the pre-forged blank 3 is subjected to a first forging step, in which the pre-forged blank 3 is extruded and drawn to form a first forged portion 31, and a second forged portion 32 connected to the first forged portion 31 and having an outer diameter smaller than that of the first forged portion 31. Due to drawing, the lower end (A) of the pre-forged blank 3 will move in the axial direction and become a lower end (A') of the first forged portion 31 that is connected to the second forged portion 32. That is, an end of the first forged portion 31, which is connected to the second forged portion 32, has an outer diameter that gradually decreases in a direction away from the first forged portion 31. This design can prevent stress concentration caused by excessive drawing. Further, a bottom end of the second forged portion 32 is formed with an inward groove 4.

In step 23, the pre-forged blank 3 is subjected to a second forging step, in which the pre-forged blank 3 is extruded and drawn to shorten a length of the first forged portion 31 and to form the second forged portion 32 into a to-be-formed section 321 connected to the first forged portion 31, and a columnar base section 322 connected to the to-be-formed section 321 and having an outer diameter smaller than that of the to-be-formed section 321. Further, an end of the base section 322, which is not connected to the to-be-formed section 321, is formed with a chamfer (B) and the inward groove 4; and, a junction between the to-be-formed section 321 and the base section 322 is formed with a fillet (C).

In step 24, the pre-forged blank 3 is subjected to a first forming step, in which the pre-forged blank 3 is extruded to form the first forged portion 31 into a ball head portion 311 and to form the base section 322 into a connecting segment 323 connected to the to-be-formed section 321 at an end that is opposite to the ball head portion 311 and having an outer diameter smaller than that of the to-be-formed section 321, and a columnar segment 324 connected to the connecting segment 323 and having an outer diameter smaller than that of the connecting segment 323. Further, a junction between the ball head portion 311 and the to-be formed section 321 is formed with a fillet (D), and a junction between the connecting segment 323 and the columnar segment 324 is formed with a fillet (E).

In step 25, the pre-forged blank 3 is subjected to a second forming step, in which the pre-forged blank 3 is extruded to form the to-be-formed section 321 into a seat section 325, thereby obtaining the hitch ball head 5. The seat section 325 includes a head-supporting segment 326 connected to the ball head portion 311 and having an outer diameter that gradually increases in a direction away from the ball head portion 311, and a seat body 327 connected to and disposed between the head-supporting segment 326 and the connecting segment 323 and having an outer diameter greater than that of the head-supporting segment 326.

In summary, the method of this disclosure for forming the hitch ball head 5 breaks away from the subtractive manufacturing of the traditional hot forging process, and does not require subsequent processing, such as cutting, so that no material waste is generated, and the utilization rate of material can be greatly improved to avoid waste of material. Further, because the method of cold forging of this disclosure directly at room temperature does not need to heat the blank, delay of time caused by waiting for the product to cool down can be avoided. At the same time, the difficulty of overall configuration and process control can also be reduced, thereby improving the yield rate of the hitch ball head 5. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for forming a hitch ball head, comprising:
   a pre-forging step, in which a columnar blank is prepared and is extruded to form a blank;
   a first forging step for forming a first forged blank, in which the blank is extruded and drawn to form a first forged portion and a second forged portion connected to the first forged portion and having an outer diameter smaller than that of the first forged portion, wherein, an end of the first forged portion, which is connected to the second forged portion, has an outer diameter that gradually decreases in a direction away from the first forged portion;
   a second forging step for forming a second forged blank, in which the first forged blank is extruded and drawn to shorten a length of the first forged portion and to form the second forged portion into a to-be-formed section connected to the first forged portion, and a columnar base section connected to the to-be-formed section and having an outer diameter smaller than that of the to-be-formed section;
   a first forming step for forming a first formed blank, in which the second forged blank is extruded to form the first forged portion of the second forged blank into a ball head portion and to form the columnar base section into a connecting segment connected to the to-be-formed section at an end that is opposite to the ball head portion and having an outer diameter smaller than that of the to-be-formed section, and a columnar segment connected to the connecting segment and having an outer diameter smaller than that of the connecting segment, wherein, a junction between the connecting segment and the columnar segment is formed with a fillet; and
   a second forming step, in which the first formed blank is extruded to form the to-be-formed section of the first formed blank into a seat section to thereby obtain the hitch ball head, the seat section including a head-supporting segment connected to the ball head portion and having an outer diameter that gradually increases in a direction away from the ball head portion, and a seat body connected to and disposed between the head-supporting segment and the connecting segment and having an outer diameter greater than that of the head-supporting segment.

2. The method as claimed in claim 1, wherein, in the second forging step, an end of the columnar base section, which is not connected to the to-be-formed section, is formed with a chamfer.

3. The method as claimed in claim 1, wherein, in the second forging step, a junction between the to-be-formed section and the columnar base section is formed with a fillet.

4. The method as claimed in claim 1, wherein, in the first forming step, a junction between the ball head portion and the to-be-formed section of the second forged blank is formed with a fillet.

5. The method as claimed in claim 1, wherein, in the first forging step, a bottom end of the second forged portion is formed with an inward groove.

* * * * *